United States Patent Office 3,532,736
Patented Oct. 6, 1970

3,532,736
NOVEL AMINO ACID PROTECTING GROUP
James W. Chamberlin, Indianapolis, Ind., assignor to Eli Lilly and Company, Indianapolis, Ind., a corporation of Indiana
No Drawing. Continuation-in-part of application Ser. No. 455,307, May 12, 1965. This application Nov. 29, 1967, Ser. No. 686,728
Int. Cl. C07c *101/18, 149/06*
U.S. Cl. 260—471       5 Claims

ABSTRACT OF THE DISCLOSURE 3,5-dimethoxybenzyloxycarbonyl amino acids useful in peptide synthesis, from which the protecting group can be quantitatively cleaved by irradiation with ultraviolet light.

Background of the invention

This application is a continuation-in-part of application Ser. No. 455,307 filed May 12, 1965 now Pat. No. 3,467,690.

Since peptides are important biological substances, and their isolation from biological systems in a pure state is difficult, it is necessary to prepare these materials by synthetic chemical methods. These methods involve as a fundamental step the coupling of two or more amino acids in a manner to form an amido linkage between the molecules:

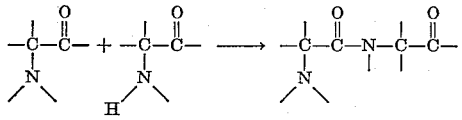

Since amino acids are at least bifunctional, it is also necessary for the chemist to render inactive all functionalities in a given amino acid which are not directly used in the amido coupling process prior to the aforesaid coupling process. If reactive functionalities are allowed to remain, yields will be lower and purifications made difficult because of the presence of large amounts of unwanted by-products from the interaction of these functionalities. Several methods are well known by the chemist for rendering inactive the functionalities of simple amino acids with protecting groups in such a manner that only the desired functional group is available to react when the amido linkage is formed. It is necessary for the so-called "protecting group" to be readily attached to the amino acid before amide formation and to be readily removed from the resulting peptide, after coupling, without simultaneous rupture of the newly formed amide linkage. Two types of protecting groups are necessary in peptide synthesis: the C-terminal protecting groups, those groups which render the acid portion of the amino acid inactive, as for example, alcohol derivatives, to prepare esters; amine derivatives, to prepare amides; and the like; and the N-terminal protecting groups, those groups which render the amine portion unreactive, such as benzyloxycarbonyl, trityl, allyloxy, and the like. It is with the latter type of protecting group that this invention is concerned.

Typical of the N-terminal protecting groups is the benzyloxycarbonyl group. This group forms, with the nitrogen atom, a carbamate linkage and is readily attached to the amino acid by methods well known in the art. The benzyloxycarbonyl-protected amino acid can then be used to prepare a dipeptide, that is, a molecule made up of two amino acid moities. After the protected amino acid has been reacted to form the desired peptide linkage, it becomes necessary to remove the benzyloxycarbonyl group.

The methods available to the chemist have classically been hydrogenolysis or hydrolysis. These reactions ideally must favor the cleavage of the carbamate bond which forms the protecting group and to leave untouched the peptide linkage. Most methods are only moderately successful in this regard. The reactions involved are equilibrium reactions and usually cause some cleavage of the amide bond.

SUMMARY

This invention relates to certain compounds useful in the art of preparing peptides.

It is an object of this invention to provide a protected amino acid in which the amine-protecting group can be easily prepared, attached to the amino acid, and then removed therefrom nearly quantitatively by actinic radiation, preferably ultraviolet light. It is also an object of this invention to provide a protected amino acid in which the amine-protecting group can be removed without the addition of acid or base. Other objects will be apparent from the following description.

In fulfillment of the above and other objects, this invention employs novel compounds represented by the following formula:

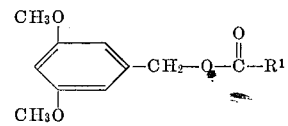

wherein
$R^1$ is halo, azido, or p-nitrophenoxy, said compounds being active intermediates for the preparation of N-terminal protected amino acids of the formula

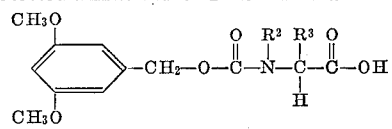

wherein
$R^2$, when taken alone, is hydrogen or $C_1$–$C_4$ alkyl;
$R^3$, when taken alone, is hydrogen, $C_1$–$C_4$ alkyl hydroxy-substituted $C_1$–$C_4$ alkyl, carboxy-substituted $C_1$–$C_4$ alkyl, lower-alkyl-mercapto-substituted $C_1$–$C_4$ alkyl, guanidino-substituted $C_1$–$C_4$ alkyl, guanidinooxy-substituted $C_1$–$C_4$ alkyl imidazolymethyl, indolylmethyl, thienyl, furyl, phenyl, or benzyl; and
$R^2$ and $R^3$, when taken together with the atoms to which they are attached, are piperidine or pyrrolidine.

"$C_1$–$C_4$ alkyl" as used herein includes methyl, ethyl, n-propyl, isopropyl, n-butyl, isobutyl, sec.-butyl, and tert.-butyl.

"Lower alkyl" includes methyl, ethyl, n-propyl, and isopropyl.

"Lower alkoxy" includes methoxy, ethoxy, n-propoxy, and isopropoxy.

"Halo" includes fluoro, chloro, and bromo.

"Lower alkylmercapto" includes methylthio, ethylthio, n-propylthio, and isopropylthio.

While the compounds of the present invention have been defined as containing certain well-recognized organic radicals—in particular $R^3$, which may include phenyl, benzyl, and certain heterocyclic radicals—it will be recognized that such radicals may bear one or more substituents without departing in any way from the spirit of the invention and without any resultant alteration in the properties of the compounds which would set them apart from the invention or take them outside its scope. Compounds bearing such substituents are accordingly to be considered as equivalents of the defined compounds and as lying within the scope of the invention. Among such substituent atoms and radicals are phenyl, halo, lower alkyl, perhalo-lower alkyl, lower alkoxy, lower alkyl-mercapto, cyano, acetyl, acetamido, hydroxy, hydroxymethyl, β-hydroxyethyl, and the like.

Illustrative compounds coming within the scope of this invention include the following:

N-3,5-dimethoxybenzoxycarbonyl L-tyrosine
N-3,5-dimethoxybenzoxycarbonyl alanine
N-3,5-dimethoxybenzoxycarbonyl phenylalanine
N-3,5-dimethoxybenzoxycarbonyl α-amino-n-butyric acid
N-3,5-dimethoxybenzoxycarbonyl D-valine
N-3,5-dimethoxybenzoxycarbonyl 2,4-dichlorophenylalanine
N-3,5-dimethoxybenzoxycarbonyl α-aminoadipic acid
N-3,5-dimehtoxybenzoxycarbonyl arginine
N-3,5-dimethoxybenzoxycarbonyl L-proline
N-3,5-dimethoxybenzoxycarbonyl S-ethylcysteine
N-3,5-dimethoxybenzoxycarbonyl 2,6-dimethoxyphenylglycine
N-3,5-dimethoxybenzoxycarbonyl aspartic acid
N-3,5-dimethoxybenzoxycarbonyl canavanine
N-3,5-dimethoxybenzoxycarbonyl 3,5-diiodotyrosine
N-3,5-dimethoxybenzoxycarbonyl ethionine
N-3,5-dimethoxybenzoxycarbonyl glutamic acid
N-3,5-dimethoxybenzoxycarbonyl histidine
N-3,5-dimethoxybenzoxycarbonyl homoserine
N-3,5-dimethoxybenzoxycarbonyl isoleucine
N-3,5-dimethoxybenzoxycarbonyl tert.-leucine
N-3,5-dimethoxybenzoxycarbonyl isovaline
N-3,5-dimethoxybenzoxycarbonyl norleucine
N-3,5-dimethoxybenzoxycarbonyl norvaline
N-3,5-dimethoxybenzoxycarbonyl methionine
N-3,5-dimethoxybenzoxycarbonyl 1-methylhistidine
N-3,5-dimethoxybenzoxycarbonyl pipecolic acid
N-3,5-dimethoxybenzoxycarbonyl sarcosine
N-3,5-dimethoxybenzoxycarbonyl serine
N-3,5-dimethoxybenzoxycarbonyl threonine
N-3,5-dimethoxybenzoxycarbonyl tryptophan Compounds of the present invention can be prepared in the following manner. 3,5-dimethoxybenzyl alcohol is prepared from the known 3,5-dimethoxybenzoic acid by any of the usual reductive procedures, such as catalytic hydrogenation or reaction with lithium aluminum hydride. The resulting carbinol is treated with phosgene in the presence of an acid scavenger, as for example, dimethylaniline, pyridine, or the like, to prepare the 3,5-dimethoxybenzyl chlorocarbonate. The chlorocarbonate is reacted directly with the amino acid to obtain the protected amino acid, or it can be converted to an azide by reaction with hydrazine and subsequent diazotization with an inorganic nitrate to produce the azide, which is reacted with the amino acid. The azide can also be prepared by treatment of the chlorocarbonate with an inorganic azide, as for example, sodium azide. As a further alternative, the 3,5-dimethoxybenzyl alcohol can be converted to the p-nitrophenyl carbonate by treatment with p-nitrophenyl chlorocarbonate in the presence of an acid scavenger, as for example, pyridine, N,N-dimethylaniline, or the like. The p-nitrophenyl carbonate derivative can then be reacted with the amino acid using aqueous sodium hydroxide solution as a condensing agent.

Cleavage of the protective group from the protected amino acid or peptide can be carried out with an apparatus equipped for the emission of ultraviolet light. A typical apparatus for such a procedure is the Hanovia 654A-36 high-pressure mercury lamp. Compounds to be irradiated should be dissolved in an aqueous medium, optionally with an organic solvent added for improved solubility. A typical solvent for the irradiation of most peptides is a 1:1 dioxane-water mixture.

3,5-dimethoxybenzyl alcohol for use in the present invention was prepared in the following manner:

To a mixture of 22.8 g. (0.601 mole) of lithium aluminum hydride and 300 ml. of tetrahydrofuran was added with stirring a solution of 110 g. (0.605 mole) of 3,5-dimethoxybenzoic acid in 800 ml. of tetrahydrofuran. The resulting mixture was refluxed for 20 hours and then stirred for an additional 3 hours. The excess lithium aluminum hydride was decomposed with saturated sodium sulfate solution, the mixture filtered, and the filtrate dried with sodium sulfate-magnesium sulfate. Evaporation of the solvent yielded 75.6 g. (74 percent) of 3,5-dimethoxybenzyl alcohol; M.P. 48–50° C.; $\lambda_{max}$ 220 m$\mu$ ($\epsilon$ 7410), 280 m$\mu$ (1760).

EXAMPLE 1

3,5-dimethoxybenzyl p-nitrophenyl carbonate

To an ice-cold solution of 28.0 g. (0.167 mole) of 3,5-dimethoxybenzyl alcohol and 5.90 g. (0.150 mole) of pyridine in 100 ml. of acetone were added with stirring 30.4 g. (0.150 mole) of p-nitrophenyl chloroformate. Immediately after the last portion had been added, a solid product began to precipitate. The resulting slurry was added to 700 ml. of water, the solid collected by filtration, washed several times with water, and recrystallized from methanol (2500 ml.). There were obtained 30.7 g. (61 percent) of 3,5-dimethoxybenzyl p-nitrophenyl carbonate, M.P. 114–115° C.

*Analysis.*—Calcd. for $C_{16}H_{15}NO_7$ (percent): C, 57.65; H, 4.54; N, 4.20. Found (percent): C, 57.91; H, 4.77; N, 3.95.

EXAMPLE 2

N-3,5-dimethoxybenzyloxycarbonyl-D-phenylglycine

A mixture of 3.66 g. (0.024 mole) of D-phenylglycine, 10.0 g. (0.030 mole) of 3,5-dimethoxybenzyloxy p-nitrophenyl carbonate, 24.0 ml. of 2 N sodium hydroxide solution, and 48 ml. of tetrahydrofuran was stirred at room temperature for 21 hours. The tetrahydrofuran was evaporated under reduced pressure. The precipitated solid was collected by filtration and washed several times with aqueous 1 M sodium bicarbonate solution. The combined filtrates were adjusted to pH 5.8 with 1 N hydrochloric acid, and the resulting mixture was extracted three times with ether to remove p-nitrophenol and any unreacted 3,5-dimethoxybenzyloxy p-nitrophenyl carbonate. The aqueous phase was then over-layered with ether and acidified to pH 2.0. The ether layer was removed and the aqueous layer was extracted twice more with ether. The ether extracts were combined, washed twice with water, once with saturated sodium chloride solution, and dried with sodium sulfate. Evaporation of the solvent and crystallization of the residue from methanol-water afforded 6.40 g. (77 percent) of 3,5-dimethoxybenzyloxycarbonyl-D-phenylglycine, M.P. 130–132.5° C. The analytical sample melted at 132.5–133.5° C., $[\alpha]_D^{25}$ −100° (C 1.05, chloroform), $pK'_a$ 5.5 (66 percent aqueous dimethylformamide), $\lambda_{max}$ 280 m$\mu$ ($\epsilon$ 1930).

*Analysis.*—Calcd. for $C_{18}H_{19}NO_6$ (percent): C, 62.60; H, 5.54; N, 4.06. Found (percent): C, 62.89; H, 5.57; N, 4.04.

Table 1 lists the physical constants of four additional amino acids prepared by the above procedure.

TABLE 1

| Amino acid | 3,5-dimethoxybenzyloxycarbonyl derivative |
|---|---|
| Glycine | Yield, 71%; M.P. 97–98° C.; neutral equivalent calculated (percent): 269; found (percent): 264; $pK'_a$ (66% dimethylformamide) 6.05; analysis calculated for $C_{12}H_{15}NO_5$ (percent): C, 53.53; H, 5.62. Found (percent): C, 53.43; H, 5.51. |
| DL-methionine | Yield, 68%; M.P. 86–88° C.; neutral equivalent calculated (percent): 343; found (percent): 337; $pK'_a$ (66% dimethylformamide) 5.95; analysis calculated for $C_{15}H_{21}NO_6S$ (percent): C, 52.46; H; 6.11. Found (percent): C, 52.68; H, 6.18. |
| L-serine | Yield, 55%; M.P. 44–56° C.; $[\alpha]_D^{25}+15.0°$ (C 1.02) neutral equivalent calculated (percent): 299; found (percent): 296; $pK'_a$ (66% dimethylformamide) 5.85; analysis calculated for $C_{13}H_{17}NO_7$ (percent): C, 52.17; H, 5.73. Found (percent): C, 51.91; H, 5.97. |
| ξ-Carbobenzoxy-L-lysine | Yield, 74%; M.P. 120.5–121.5° C.; $[\alpha]_D^{27}+11.7°$ (CHCl$_3$, C 1.02); neutral equivalent calculated (percent): 475; found (percent): 480; $pK'_a$ 6.05 (66% DMF); analysis calculated for $C_{24}H_{30}N_2O_8$ (percent): C, 60.75; H, 6.37. Found (percent): C, 60.98; H, 6.51. |

EXAMPLE 3

N-3,5-dimethoxybenzyloxycarbonyl-D-phenylglycylglycine

A solution of 13.8 g. (0.004 mole) of 3,5-dimethoxybenzylcarbonyl-D-phenylglycine in 20 ml. of tetrahydrofuran was cooled in a salt-ice bath and 0.56 ml. of triethylamine was added, followed by 0.52 ml. of isobutyl chloroformate. The mixture was stirred for 15 minutes. A cold solution of 0.300 g. (0.004 mole) of glycine and 0.56 ml. of triethylamine in 20 ml. of 1:1 water-tetrahydrofuran was then added dropwise, and the mixture was stirred for one hour in the cold and one hour at room temperature. The tetrahydrofuran was removed under reduced pressure. The residue was diluted with 20 ml. of water and washed once with 20 ml. of ethyl acetate. The aqueous phase was separated, diluted with 40 ml. of water, over-layered with 40 ml. of ethyl acetate, and the pH adjusted to 2.5 with 10 percent hydrochloric acid. The aqueous phase was extracted once more with 40 ml. of ethyl acetate. The ethyl acetate extracts were combined, washed once with water and dried with anhydrous sodium sulfate. The solid residue obtained upon evaporation of the solvent was slurried with ether and filtered to give 1.16 g. (72 percent) of 3,5-dimethoxybenzyloxycarbonyl-D-phenylglycylglycine, M.P. 156–157° C. The analytical sample was obtained by recrystallization from methanol-water, M.P. 156.5–157.5° C., $[\alpha]_D^{25}$ −60.3° (C=0.823, ethanol), $pK'_a$ 5.9 (66% aqueous dimethylformamide).

*Analysis.*—Calcd. for $C_{20}H_{22}N_2O_7$ (percent): C, 59.69; H, 5.51; N, 6.96. Found (percent): C, 59.42; H, 5.68; N, 6.69.

GENERAL PROCEDURE AND APPARATUS FOR IRRADIATION

The irradiations were carried out with a Hanovia 654A–36 high-pressure mercury lamp housed in a water-cooled quartz immersion well and fitted with a Vycor glass (Corning No. 7910) filter sleeve. The compound to be irradiated was dissolved in one liter of 1:1 dioxane-water. Nitrogen was passed through the solution during the course of the reaction. An irradiation time of 1.5 hours was employed for the preparative experiments. The progress of the reactions was followed by paper chromatography (ninhydrin). In all cases studied, no free amino acid was detected by this method in aliquot samples maintained in the dark during the irradiation period. The dipeptide and the amino acids were isolated by evaporating the solution to dryness, treating the residue with a minimum volume of acetone, and collecting the product by filtration.

EXAMPLE 4

Irradiation of N-3,5-dimethoxybenzyloxyglycine

A solution of 1.345 g. (0.005 mole) of 3,5-dimethoxybenzyloxycarbonylglycine in one liter of 1:1 dioxane-water was irradiated by the general procedure above for 1.5 hours. The clear solution was evaporated to dryness, and the residue was treated with a small amount of acetone to crystallize the resulting glycine. Yield: 0.318 g. (85%), $pK'_a$ 3.85, 10.35 (66% aqueous dimethylformamide). Neutral equiv.

Calcd. for $C_2H_5NO_2$: 75.1. Found: 78.2.

The acetone filtrate from the filtration of the crystallized glycine was evaporated to dryness. The residue was taken up in ethyl acetate and passed through a column of Woelm neutral alumina (activity III, 25 g.). Elution with ethyl acetate provided 0.734 g. of yellowish oil that crystallized on standing, M.P. 34–43° C. The infrared spectrum of this material was identical with that of 3,5-dimethoxybenzyl alcohol. Recrystallization from Skellysolve B afforded 0.235 g. of the alcohol, M.P. 43–46° C., and a second crop of 0.088 g., M.P. 40–45° C. The total yield of recrystallized 3,5-dimethoxybenzyl alcohol amounted to 38 percent. Table 2 lists the yield of purified amino acid recovered upon irradiation of the 3,5-dimethoxybenzyloxy carbonyl derivative.

Table 2

| Amino acid: | Yield |
|---|---|
| DL-Methionine | 60%. |
| D-Phenylglycine | 66%. |
| L-Serine | 72%. |
| ε-Carbobenzoxy-L-lysine | 62% of the ε-carbobenzoxy protected amino acid. |

EXAMPLE 5

Irradiation of N-3,5-dimethoxybenzyloxy D-phenylglycylglycine

A solution of 1.00 g. (0.00249 mole) of 3,5-dimethoxybenzyloxycarbonyl-D-phenylglycylglycine in one liter of 1:1 dioxane-water was irradiated for 1.5 hours. Following the isolation procedure described above for glycine, there was obtained 0.335 g. (65%) of D-phenylglycylglycine, M.P. 226–228° C., $[\alpha]_D^{25}$ −112° (C 0.484, 0.1 N HCl), $pK'_a$ 5.35, 7.55 (66% aqueous dimethylformamide). Neut. equiv. calcd. for $C_{10}H_{12}N_2O_3$: 208. Found: 216.

I claim:
1. A compound of the formula:

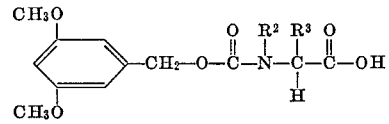

wherein
 $R^2$, when taken alone, is a member of the group consisting of hydrogen and $C_1$–$C_4$ alkyl;
 $R^3$, when taken alone, is a member of the group consisting of hydrogen, $C_1$–$C_4$ alkyl, hydroxy-substituted $C_1$–$C_4$ alkyl, carboxy-substituted $C_1$–$C_4$ alkyl, lower alkyl-mercapto-substituted $C_1$–$C_4$ alkyl, guanidino-substituted $C_1$–$C_4$ alkyl, guanidinooxy-substituted $C_1$–$C_4$ alkyl, imidazolylmethyl, indolylmethyl, thienyl, furyl, phenyl, and benzyl; and
 $R^2$ and $R^3$, when taken together with the atoms to which they are attached, are members of the group consisting of piperidine and pyrrolidine.
2. A compound as in claim 1 wherein $R^2$ and $R^3$ are hydrogen.
3. A compound as in claim 1 wherein $R^2$ is hydrogen and $R^3$ is methylmercaptoethyl.
4. A compound as in claim 1 wherein $R^2$ is hydrogen and $R^3$ is phenyl.
5. A compound as in claim 1 wherein $R^2$ is hydrogen and $R^3$ is hydroxymethyl.

References Cited

UNITED STATES PATENTS 3,243,423  3/1966  Beyerman _____ 260—112.5

LORRAINE A. WEINBERGER, Primary Examiner

L. A. THAXTON, Assistant Examiner

U.S. Cl. X.R.

204—160.1; 260—112.5, 294.3, 309.6, 326.13, 326.3, 332.2, 347.4, 481, 482